(12) United States Patent
Kirchner et al.

(10) Patent No.: US 8,671,793 B2
(45) Date of Patent: Mar. 18, 2014

(54) LUBRICATION OF A ROTATABLE SHAFT

(75) Inventors: Eckhard Kirchner, Ginsheim (DE); Jo Vermeulen, Kellyville (AU); Richard Tamba, Castle Hill (AU)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 13/015,046

(22) Filed: Jan. 27, 2011

(65) Prior Publication Data

US 2011/0179897 A1 Jul. 28, 2011

(30) Foreign Application Priority Data

Jan. 27, 2010 (DE) .................. 10 2010 005 821

(51) Int. Cl.
*F16H 57/04* (2010.01)
(52) U.S. Cl.
USPC ............................. 74/467; 184/6.12
(58) Field of Classification Search
USPC ............... 74/330, 467, 606 A, 608; 184/6.12
See application file for complete search history.

(56) References Cited

U.S. PATENT DOCUMENTS

| | | | |
|---|---|---|---|
| 4,644,815 A | | 2/1987 | Kawano et al. |
| 5,341,901 A | * | 8/1994 | Mueller et al. ............... 184/6.12 |
| 5,713,670 A | * | 2/1998 | Goldowsky .................. 384/115 |
| 6,296,445 B1 | | 10/2001 | Chasseguet et al. |
| 6,397,692 B1 | * | 6/2002 | Carriere ......................... 74/331 |
| 6,997,284 B1 | * | 2/2006 | Nahrwold .................... 184/6.12 |
| 7,694,780 B2 | * | 4/2010 | Beels van Heemstede et al. ............................. 184/6.12 |
| 2007/0277635 A1 | * | 12/2007 | Komori ........................... 74/340 |
| 2011/0107860 A1 | * | 5/2011 | Ross ............................... 74/330 |

FOREIGN PATENT DOCUMENTS

| | | |
|---|---|---|
| DE | 3110051 A1 | 9/1982 |
| DE | 3320086 A1 | 12/1984 |
| DE | 19829925 A1 | 1/2000 |
| DE | 19980674 T1 | 8/2000 |

OTHER PUBLICATIONS

German Patent Office, German Search Report for Application No. 10 2010 005 821.1 dated Nov. 10, 2010.

* cited by examiner

*Primary Examiner* — Troy Chambers
*Assistant Examiner* — Michael Gonzalez
(74) *Attorney, Agent, or Firm* — Ingrassia Fisher & Lorenz, P.C.

(57) ABSTRACT

A machine has a shaft rotatable in at least one lubricated bearing. A lubricant duct for lubricating the bearing extends along the first shaft. A turbine, having blades engaging radially in the lubricant duct and oriented warped to the axis of the first shaft, is situated in the lubricant duct.

12 Claims, 3 Drawing Sheets

LUBRICATION OF A ROTATABLE SHAFT

CROSS-REFERENCE TO RELATED APPLICATION

This application claims priority from German Patent Application No. 102010005821.1, filed Jan. 27, 2010, which is incorporated herein by reference in its entirety.

TECHNICAL FIELD

The technical field relates to a machine having a shaft rotatable in at least one lubricated bearing, and in particular the lubricant supply of this bearing.

BACKGROUND

A machine having a shaft rotatable in a lubricated bearing is known from DE 33 20 086 C2, in which a lubricant duct for lubricating the bearing extends axially in the interior of the shaft. In that the lubricant duct is guided along the shaft, lubricant points are also reachable which are difficult to supply in other ways, typically via ducts guided in a housing of the machine. The lubricant duct in the interior of a shaft can be long, however, and its cross-section is narrowly limited, because it cannot weaken the shaft, on the one hand, but the diameter of the shaft is to be as small as possible, on the other hand, so that, both for reasons of cost and also to avoid unnecessary friction losses, the diameter of the bearings receiving the shaft may be kept as smallest possible. It is thus necessary to supply lubricant from a lubricant source at elevated pressure. A pump required for this purpose increases both the costs of the machines and also the breakdown risk.

In view of the foregoing, at least one object is therefore to specify a machine having a first shaft rotatable in at least one lubricated bearing and a lubricant duct extending along the first shaft for lubricating the bearing, which manages without an external pump for supplying the lubricant at elevated pressure. In addition, other objects, desirable features and characteristics will become apparent from the subsequent summary and detailed description, and the appended claims, taken in conjunction with the accompanying drawings and this background.

SUMMARY

The at least one object is achieved in that, in such a machine, a turbine, having blades engaging radially in the lubricant duct and oriented warped to the axis of the first shaft, is situated in the lubricant duct. Because of their orientation, the blades provide the lubricant circulating in the lubricant duct with an impulse in the axial direction, so that the pressure of the lubricant in the duct is elevated downstream from the turbine and sufficient lubrication of the bearing can be ensured via the duct.

The turbine is preferably connected rotationally fixed to the shaft. Such a turbine does not require parts rotatable in relation to the shaft on its part and is therefore maintenance-free and nearly indestructible in normal operation of the machine. The lubricant duct can have a widened area on a first end of the shaft, in which the turbine is inserted and in which it is preferably held in a friction-locked or formfitting manner. The turbine can be installed in a conceivably simple manner by insertion in the widened area. The blades of the turbine preferably terminate flush with an end of the shaft, in order to acquire lubricant standing at the end of the shaft and draw it into the lubricant duct.

The turbine can be implemented in a simple way, in that a plurality of holes oriented warped to the axis are formed in a main body. The blades are each formed by intermediate walls between adjacent holes. In order to avoid an imbalance, the holes are expediently transferable congruently into one another by a rotation around the axis of the turbine. The warped holes may be fused with one another to form a single axial passage. If the warped holes diverge toward an outlet side of the turbine, the centrifugal force acting on lubricant flowing through during the rotation of the turbine can also contribute to the conveyance action of the turbine.

In order to supply the turbine with lubricant, high pressure is not required at the intake of the turbine or at the end of the first shaft on which the turbine is attached. It is thus possible in particular to feed the turbine via a drop catcher, which is attached on the circumference of a rotating wheel immersed in a lubricant reservoir, in order to collect lubricant spun off of the wheel.

The machine is preferably a stepped transmission, in particular a shift transmission or a double-clutch transmission for a motor vehicle.

The rotating wheel immersed in the lubricant reservoir can particularly be a ring gear of a differential in such a transmission.

The impulse increases achievable using the turbine, it is possible to supply still one or more additional lubrication points downstream from the first shaft via the lubricant duct running through the first shaft. Alternatively, the turbine can also be situated between two lubrication points of a multipart supply line, in order to compensate for pressure losses along the supply line or volume losses on the lubrication point located upstream, and also ensure a sufficient lubricant feed to the lubrication point further located downstream. In particular, bearings of the first and at least one second shaft may be supplied with lubricant, in that a lubricant duct in this second shaft is connected in series to the lubricant duct of the first shaft, the second shaft being able to be situated both upstream and also downstream from the first shaft.

BRIEF DESCRIPTION OF THE DRAWINGS

The embodiments will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
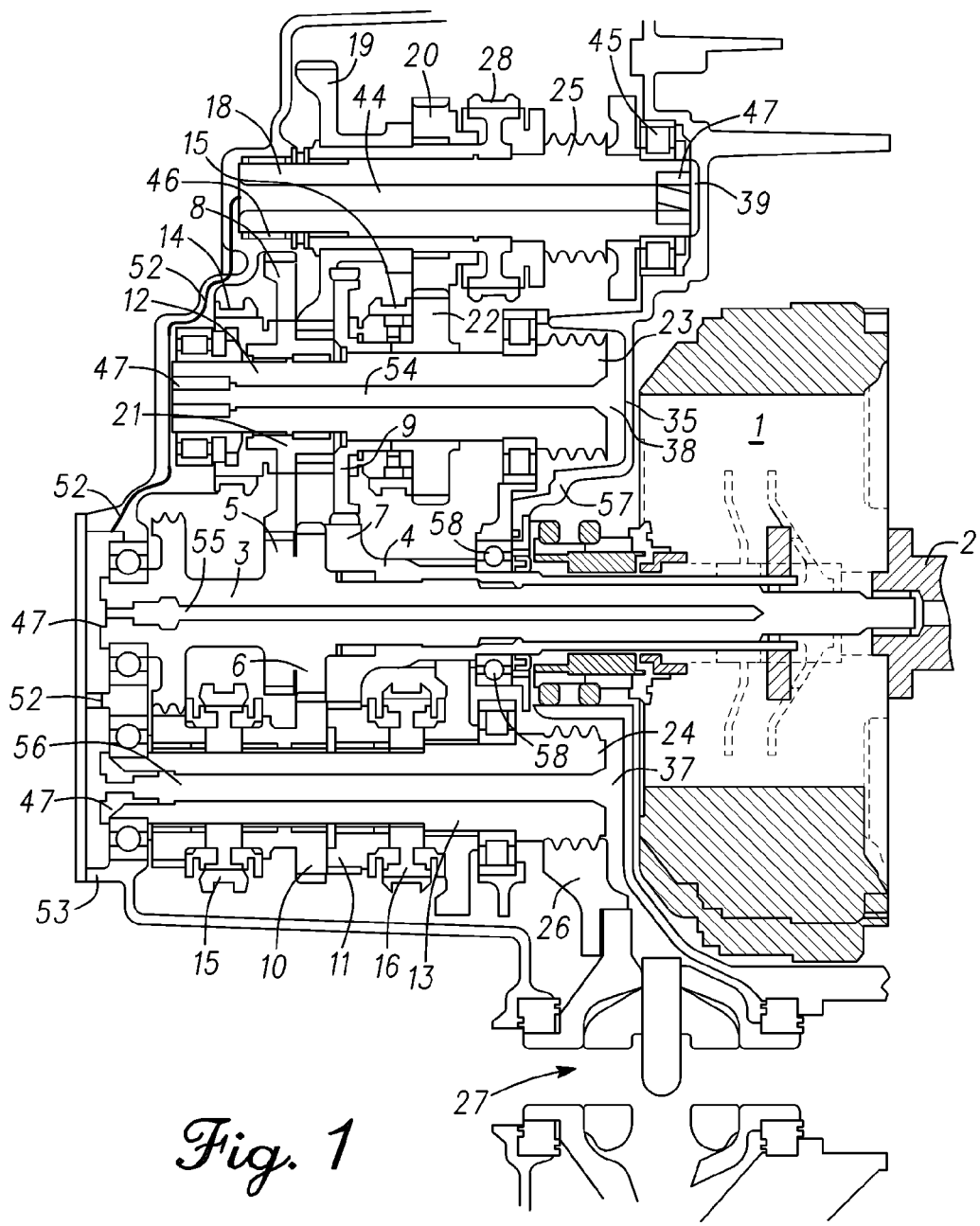
FIG. 1 shows a double-clutch transmission in an axial section.

FIG. 1 shows a schematic section through a double-clutch transmission for a motor vehicle. A double clutch 1, which is known per se, is situated between the output shaft 2 of an engine (not shown) and two input shafts 3, 4 of the transmission, which are situated concentrically to one another on the same axis, to alternately apply torque to the input shaft 3 or the input shaft 4.

Multiple gearwheels 5, 6, 7 are installed rotationally fixed on the input shafts 3, 4, which in turn mesh with gearwheels 8 to 11 on two parallel lay shafts 12, 13. The gearwheels 8 to 11 of the lay shafts 12, 13 are fixable in a rotationally fixed manner on the lay shafts 12, 13 via locking synchronization devices 14 to 17. A third lay shaft 18 carries gearwheels 19, 20, which mesh with gearwheels 21, 22 of the lay shaft 12. In that, for example, the locking synchronization device 15 couples the gearwheel 22 to the lay shaft 12, a first gear of the transmission can be implemented by torque transmission between the gearwheels 5, 8, 21, 19, 20, 22.

In order to allow shifting between the gears without torque interruption, the second gear, like all even-numbered gears, is assigned to the hollow input shaft 4, while the odd-numbered gears are produced via the inner input shaft 3, which extends through the hollow input shaft 4. Since the principles of such double-clutch transmissions have been previously published in various forms, they do not need to be explained in detail here.

Every lay shaft 12, 13, 18 carries a pinion 23, 24, 25, which meshes with a ring gear 26 of a differential 27. In that a locking synchronization device 28 locks the gearwheels 19, 20 on the lay shaft 18, a reverse gear can be generated via its pinion 25.

Figure 2:
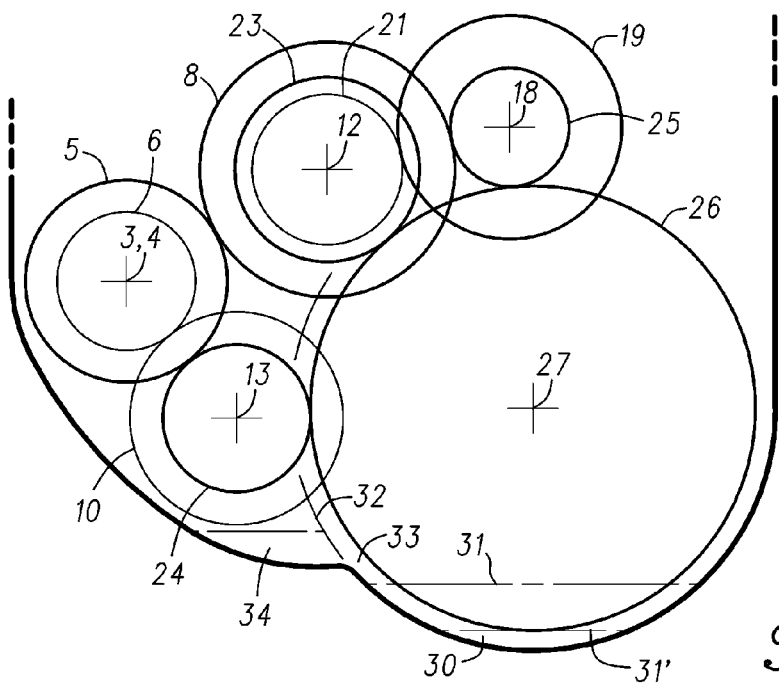
FIG. 2 shows the double-clutch transmission in a schematic cross-section.

FIG. 2 illustrates the location of the axes of the differential 27, the input shafts 3, 4, and the lay shafts 12, 13, 18 in a housing 29, which encloses the transmission. Some of the gearwheels of the transmission are shown as circles concentric to the axes in FIG. 2

The ring gear 26 of the differential 27 extends furthest down of all gearwheels and is immersed on a part of its circumference in the oil sump 30. In order to keep splashing losses small, the oil level 31, which is indicated as a dot-dash line, is set when the transmission is stationary so that the gearwheels of the shafts 3, 4, 12, 13, 18 are not immersed and their teeth which mesh with one another are lubricated by oil mist swirled up by the ring gear 26. When the transmission is running, the oil from the sump 30 is distributed everywhere in the housing 29. Oil which runs off of the shafts 3, 4, 12, 13 and their gearwheels first reaches a temporary store 34, which lies somewhat higher than the oil sump 30 in the housing 29 and is separated from the oil sump 30 by an inner wall 32. A narrow gap 33 at the lower end of the inner wall 32 allows a delayed backflow of the oil into the sump 30. This has the result that in operation, the oil level of the sump 30 drops to a level 31', which is still sufficient to wet the teeth of the ring gear 26. The splashing losses of the transmission in continuous operation are thus close to zero.

Figure 3:
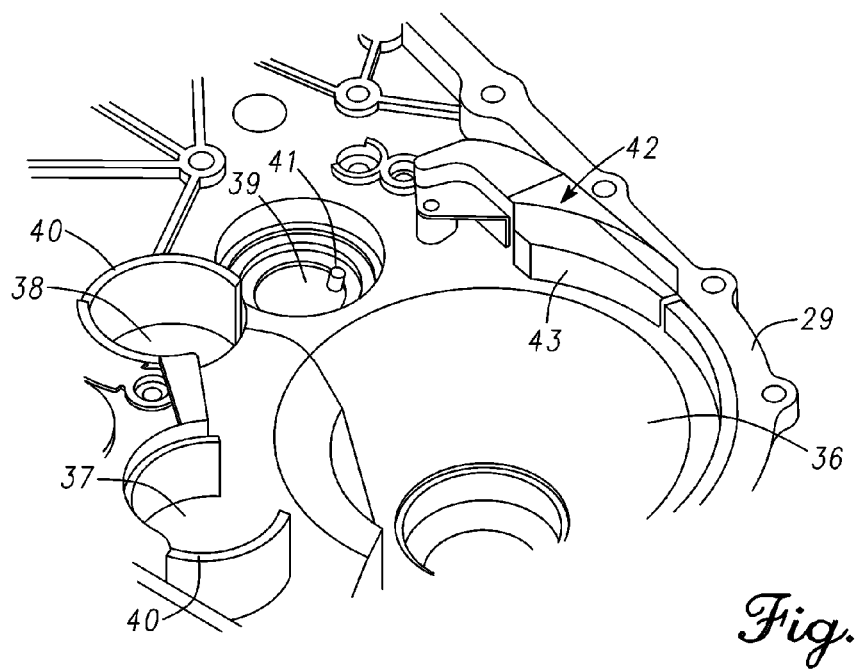
FIG. 3 shows a detail view of a housing wall of the transmission having a drop catcher fastened on the housing wall.

FIG. 3 shows a perspective detail view of an inner side of a wall 35 of the housing 29 enclosing the transmission. A roomy recess 36, which is provided to accommodate a part of the differential 27, fills up a majority of the lower area of the wall 35. Recesses 37, 38, 39 are shown all around the recess 36, in each case for an end section of the lay shafts 13, 12, or 18, respectively. While the recesses 37, 38 are essentially delimited by ribs 40 protruding from the wall 35, the recess 39 is indented in the wall 35, and the end of a hole 41 can be seen on its floor, which extends within the wall 35 to a drop catcher 42. The drop catcher 42 has a cross-section curved like a horn having an open end 43, which faces toward the ring gear 26 (not shown in FIG. 3) to catch oil, which the teeth of the ring gear 26 entrain from the oil sump 30 during its rotation and subsequently spin off. The collected oil reaches the recess 39 via the drop catcher 42 and the hole 41 and stands at a front end of the lay shaft 18 there.

Figure 4:
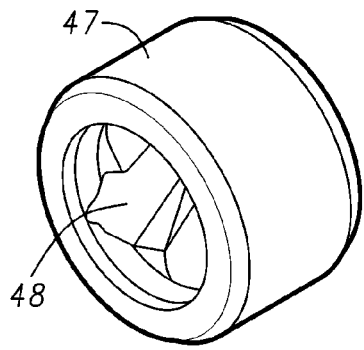
FIG. 4 shows a perspective view of a turbine for lubricant oil conveyance.
Figure 5:
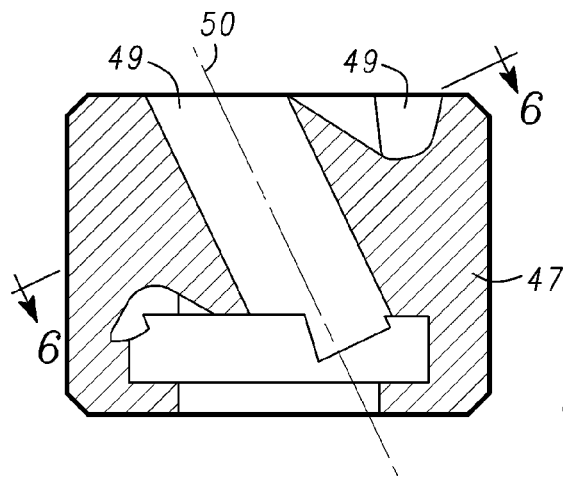
FIG. 5 shows a section through the turbine in a plane shifted parallel to the axis of the turbine.
Figure 6:
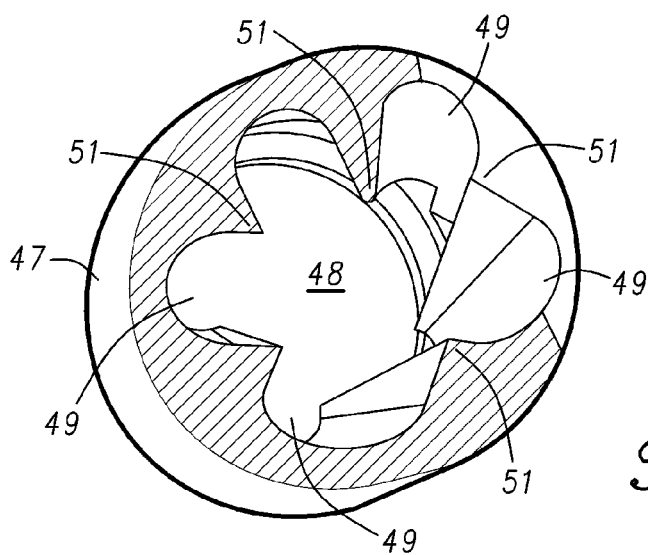
FIG. 6 shows a section through the turbine along plane VI-VI from FIG. 5.

As shown in FIG. 1, a duct 44 extends over the entire length of the lay shaft 18, and spur lines (not shown in FIG. 1 for the sake of clarity) branching from the duct 44 lead to roller bearings 45, 46 adjacent to the ends of the lay shaft 18, in order to supply them with oil. In order to convey the oil throughput through the duct 44, a turbine 47 is inserted into a widened area on the end of the lay shaft 18 facing toward the recesses 39. FIG. 4, FIG. 5, and FIG. 6 show this turbine 47 in a perspective view or in section.

The turbine 47 is, as shown in FIG. 4, a one-piece metal body essentially having the form of a flat cylinder, through which a passage 48 extends in the axial direction. The passage 48 is obtained by multiple drilling or milling steps. Multiple holes 49, five here, are advanced at uniform angular intervals to one another warped to the axis of symmetry through the body of the turbine 47; i.e., each rotation of the turbine 47 by $2\pi/5$ around its axis of symmetry transfers the turbine 47 into itself. The diameter of the holes 49 is selected so that they fuse into a single passage 48. FIG. 5 shows a section through the turbine 47 along an axis—identified by 50 here—of such a hole 49, a second hole 49 may be seen in the section.

FIG. 6 shows the turbine in section along the plane VI-VI, which is perpendicular to the hole axis 50, from FIG. 5. In this section, walls 51, which remain between the individual holes 49 and protrude radially inward into the passage 48, may be seen, which give oil penetrated therein an impulse in the axial direction when the turbine 47 rotates. As also shown in the section of FIG. 6, the holes 49 approach closer and closer to the outer circumference of the turbine on the downstream side of the turbine 47. Therefore, not only the warped orientation of the holes 49 and walls 51, but rather also the centrifugal force acting in the rotating turbine 47 drive the oil through the turbine 47. A dynamic pressure can thus be built up downstream from the turbine 47 in the duct 44, which ensures a sufficient oil supply of the roller bearings 45, 46 and additionally also allows the supply of roller bearings of the lay shafts 12, 13 and the input shafts 3, 4 via lines 52, which, as shown in FIG. 1, connect the downstream end of the duct 44 to ducts 54, 55, 56 of these shafts in a wall 53 of the transmission housing facing away from the double clutch 1 and the differential 27.

To increase the oil pressure in the ducts 54, 55, 56, the shafts 3, 12, 13 may also be provided with turbines 47 on the input side, i.e., on their end facing away from the double clutch 1.

It is also conceivable to only provide the shafts 3, 12, 13 located downstream with turbines 47, in order to ensure a lubrication of their roller bearings which is qualitatively equivalent to the lubrication of the roller bearings 45, 46.

The embodiments have been described above especially with reference to a transmission having double clutch, since such transmissions represent a preferred area of application. The increased space requirement of the double clutch 1 in comparison to a typical single clutch results in strong contouring of the wall 35, having a projection 57 protruding far into the transmission housing 29 around the input shafts, which makes the oil supply of the roller bearings 58, which bear the shafts 3, 4, 12, 13 on the side of the wall 35, difficult via lines guided in the wall 35. However, it is obvious that the invention is also usable in other constructions of transmissions or in general for the oil supply of any desired lubrication points in diverse types of machines.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A machine, comprising:
   a lubricated bearing;
   a first shaft rotatable in the lubricated bearing;
   a lubricant duct adapted for lubricating the lubricated bearing extending along the first shaft, wherein the lubricant duct comprises an expanded area at an end of the first shaft; and
   a turbine situated in the expanded area of the lubricant duct and comprising blades adapted to engage radially in the lubricant duct and oriented warped to an axis of the first shaft.

2. The machine according to claim 1, wherein the turbine is connected rotationally fixed to the first shaft.

3. The machine according to claim 1, wherein the blades terminate flush with an end of the first shaft.

4. The machine according to claim 1, wherein the lubricant duct extends from an end of the first shaft to a second end and adapted to supply a lubrication point downstream from the first shaft.

5. The machine according to claim 1, further comprising a second lubricant duct in a second shaft connected in series to the lubricant duct of the first shaft.

6. The machine according to claim 1, wherein the turbine is fed via a drop catcher attached on a circumference of a rotating wheel immersed in a lubricant reservoir.

7. The machine according to claim 6, wherein the rotating wheel is a ring gear of a differential.

8. The machine according to claim 1, wherein the machine is a stepped transmission.

9. The machine according to claim 8, wherein the stepped transmission comprises a double clutch.

10. The machine according to claim 1, wherein the turbine comprises a plurality of holes oriented warped to the axis and transferable congruently into one another by a rotation around the axis, the blades formed by intermediate walls between the plurality of holes.

11. The machine according to claim 10, wherein the plurality of holes are fused to form a passage.

12. The machine according to claim 10, wherein the plurality of holes diverge toward an outlet side of the turbine.

* * * * *